United States Patent
Griffin et al.

(10) Patent No.: US 8,881,287 B1
(45) Date of Patent: Nov. 4, 2014

(54) SYSTEMS AND METHODS FOR LIBRARY FUNCTION IDENTIFICATION IN AUTOMATIC MALWARE SIGNATURE GENERATION

(75) Inventors: Kent Griffin, Los Angeles, CA (US); Xin Hu, Ann Arbor, MI (US); Tzi-cker Chiueh, Setauket, NY (US); Scott Schneider, Santa Monica, CA (US)

(73) Assignee: Symantec Corporation, Mountain View, CA (US)

( * ) Notice: Subject to any disclaimer, the term of this patent is extended or adjusted under 35 U.S.C. 154(b) by 983 days.

(21) Appl. No.: 12/408,277

(22) Filed: Mar. 20, 2009

(51) Int. Cl.
*G06F 11/00* (2006.01)

(52) U.S. Cl.
USPC ............... 726/25; 726/22; 726/23; 726/24

(58) Field of Classification Search
CPC ...... G06F 21/564; G06F 21/562; G06F 21/56
USPC ...................... 713/188; 726/22, 24
See application file for complete search history.

(56) References Cited

U.S. PATENT DOCUMENTS

| | | | |
|---|---|---|---|
| 5,452,442 A | 9/1995 | Kephart | |
| 6,802,006 B1 * | 10/2004 | Bodrov | 713/187 |
| 7,418,729 B2 | 8/2008 | Szor et al. | |
| 7,650,504 B2 * | 1/2010 | Bodrov | 713/176 |
| 8,291,497 B1 | 10/2012 | Griffin et al. | |
| 2004/0003385 A1 * | 1/2004 | Kushlis | 717/158 |
| 2005/0108562 A1 * | 5/2005 | Khazan et al. | 713/200 |
| 2007/0226801 A1 * | 9/2007 | Gopalan et al. | 726/24 |
| 2007/0240222 A1 | 10/2007 | Tuvell et al. | |
| 2008/0127336 A1 * | 5/2008 | Sun et al. | 726/22 |
| 2008/0201779 A1 * | 8/2008 | Tahan et al. | 726/23 |
| 2008/0263669 A1 | 10/2008 | Alme | |
| 2010/0154063 A1 * | 6/2010 | Hutton et al. | 726/24 |

OTHER PUBLICATIONS

Emmerik, Mike V., "Identifying Library Functions in Executable File Using Patterns", Aug. 6, 2002, [Retrieved from the Internet Aug. 17, 2011], "http://ieeexplore.ieee.org/stamp/stamp.jsp?tp=&arnumber=730916".*
Atkinson, Darren C., "Accurate Call Graph Extraction of Programs with Function Pointers Using Type Signatures", Jan. 17, 2005, [Retrieved from the Internet Aug. 17, 2011], "http://ieeexplore.ieee.org/stamp/stamp.jsp?tp=&arnumber=1371935".*
Keil Software Application Note APNT_129 "Function Pointers in C51", Apr. 27, 1999, [Retrieved from the Internet Aug. 19, 2011], "http://www.keil.com/appnotes/files/apnt_129.pdf".*
Hitex Development Tools, "C51 Primer", 2006, [Retrieved from the Internet Aug. 22, 2011], "ftp://ftp.ti.com/pub/data_acquisition/MSC_CD-ROM/C_Programming/C51Primer.pdf".*

(Continued)

*Primary Examiner* — Christopher Brown
*Assistant Examiner* — Roderick Tolentino
(74) *Attorney, Agent, or Firm* — ALG Intellectual Property, LLC

(57) ABSTRACT

A computer-implemented method for facilitating automatic malware signature generation may comprise disassembling a malware program, identifying one or more byte sequences within the disassembled malware program that have a likelihood of being representative of one or more library functions contained within the malware program, and preventing the one or more byte sequences from being included within one or more malware signatures. Corresponding systems and computer-readable storage media are also disclosed.

20 Claims, 8 Drawing Sheets

(56) References Cited

OTHER PUBLICATIONS

Wagener, Gerard et al., "Malware Behaviour Analysis", Jul. 2007, [Retrieved from the Internet Aug. 22, 2011], "http://www.labri.fr/perso/fleury/courses/SS/download/papers/Malware_behaviour_analysis.pdf".*

Bruschi, Danilo et al. "Using Code Normalization for Fighting Self-Mutating Malware", Aug. 2006, [Retrieved from the Internet Aug. 22, 2011], "http://homes.dico.unimi.it/~monga/lib/issse06.pdf".*

Xu, Haizhi et al., "Improving Address Space Randomization with a Dynamic Offset Randomization Technique", Apr. 2006, [Retrieved from the Internet Aug. 19, 2011], "cseweb.ucsd.edu/~hovav/dist/asrandom.pdf".*

Li et al., "Malware Behavior Extracting via Maximal Patterns," Information Science and Engineering (ICISE), 2009 1st International Conference, pp. 1759-1764.*

Nan et al. "An Algorithm for Generation of Attack Signatures Based on Sequences Alignment," Computer Science and Software Engineering, 2008 International Conference, pp. 964-969.*

Kephart, Jeffrey et al.; "Automatic Extraction of Computer Virus Signatures"; In Proceedings of the 4th Virus Bulletin International Conference, R. Ford, ed.; Virus Bulletin Ltd.;1994; pp. 178-184; Abingdon, England http://www.research.ibm.com/antivirus/SciPapaers/Kephart/VB94/vb94.html.

Guilfanov, Ilfak et al.; "Hex-Rays : Interactive Disassembler Pro—FLIRT Technology"; (accessed May 15, 2009); http://www.hex-rays.com/idapro/flirt.html.

Lee, Seoung-Won et al.; "Enhanced Hot Spot Detection Heuristics for Embedded Java Just-in-Time Compilers"; Proceedings of the 2008 ACM SIGPLAN-SIGBED; (accessed May 15, 2009); pp. 13-22; ACM; NYC, NY, USA; http://portal.acm.org/citation.cfm?id=1375657.1375660&coll=ACM&dl=ACM.

Lee, Seoung-Won et al.; "Enhanced Hot Spot Detection Heuristics for Embedded Java Just-in-Time Compilers"; ACM SIGPLAN Notices; Jul. 2008; V.43—Issue 7; ACM; NYC, NY, USA; http://portal.acm.org/citation.cfm?id=1379023.1375660&coll=&dl=ACM.

"Heuristic analysis"; (accessed May 15, 2009); Wikipdedia; http://en.wikipedia.org/wiki/Heuristic_analysis.

Pierce, Cody; "MindshaRE: The IDA Pro Book"; Aug. 28, 2008; http://dvlabs.tippingpoint.com/blog/2008/08/28/mindshare-the-ida-pro-book.

"IDA Pro Disassembler and Debugger"; Mar. 22, 2008; http://www.h33t.com/details.php?id=ffcf99fcaf96e60e4d296c973fcd4b255b09aff7.

"Some Projects Require Space and Time . . . IDA Pro 4.30 Saves Time . . . Gives Space"; (accessed May 18, 2009); http://www.datarescue.be/idafreeware/430brochure.pdf.

\* cited by examiner

SYSTEMS AND METHODS FOR LIBRARY FUNCTION IDENTIFICATION IN AUTOMATIC MALWARE SIGNATURE GENERATION

BACKGROUND

Consumers and businesses increasingly rely on computers to store sensitive data. Consequently, malicious programmers seem to continually increase their efforts to gain illegitimate control and access to others' computers. Computer programmers with malicious motivations have created and have continued to create viruses, Trojan horses, worms, and other programs meant to compromise computer systems and data belonging to other people. These malicious programs are often referred to as malware.

Security software companies are combating the growing tide of malware by creating and deploying malware signatures (e.g., sequences of bytes that identify malware) to their customers on a regular basis. By frequently updating malware signatures, security software companies may help their customers secure their computers against new and changing threats.

Given the rapidly increasing number of malicious programs that are being developed, there exists a strong motivation for developing techniques to automate malware signature generation. A technical challenge associated with automatic malware signature generation is ensuring that the malware signatures do not result in false positives when used to identify or detect malware. In other words, it is desirable to minimize the number of goodware programs that are incorrectly identified as malware using automatically generated malware signatures.

SUMMARY

As will be described in greater detail below, the instant disclosure generally relates to systems and methods for facilitating automatic malware signature generation by identifying byte sequences within a malware program that have a likelihood of being representative of library functions. Library functions are often used by both malware and goodware. Hence, the systems and methods described herein may prevent the identified byte sequences from being included within one or more automatically generated malware signatures. In this manner, the number of goodware programs that are incorrectly identified as malware using the automatically generated malware signatures is minimized.

In some embodiments, a computer-implemented method for facilitating automatic malware signature generation may comprise: 1) disassembling a malware program, 2) identifying one or more byte sequences within the disassembled malware program that have a likelihood of being representative of one or more library functions contained within the malware program, and 3) preventing the one or more byte sequences from being included within one or more malware signatures.

In some embodiments, a byte sequence may be identified as having a likelihood of being representative of a library function if the byte sequence matches a library signature corresponding to a library function associated with at least one compiler, is associated with a function called by a known library function, is located within a predetermined distance from an address space corresponding to at least one known library function, and/or accesses at least one global variable associated with the malware program.

By proceeding in this manner, the exemplary systems and methods described herein may reduce the number of library functions used to generate malware signatures, and thereby minimize the number of goodware programs incorrectly identified as comprising malware.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
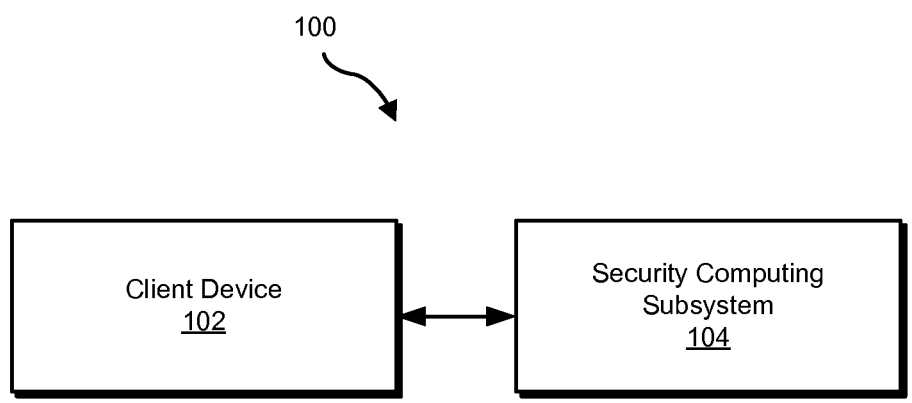
FIG. 1 is a block diagram of an exemplary system for identifying malware according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for facilitating automatic malware signature generation. As used herein, the term "malware signature" refers to a sequence of bytes used to identify malware.

The systems and methods described herein facilitate automatic signature generation by identifying byte sequences within a malware program that have a likelihood of being representative of library functions. The identified byte sequences may then be prevented from being included within one or more automatically generated malware signatures. In this manner, as will be described in more detail below, the systems and methods described herein may minimize the number of goodware programs (e.g., programs and/or files that do not comprise malware) that are incorrectly identified as malware using automatically generated malware signatures.

The terms "byte sequence within a malware program" and "byte sequence within a disassembled malware program" will be used interchangeably herein to refer to a byte sequence contained within a malware program in a disassembled state. A byte sequence within a malware program may be identified as having a "likelihood" of being representative of a library function if it is determined that the byte sequence is associated with a known library function, matches a library signature associated with a known library function, is associated with a function called by a known library function, and/or accesses a global variable associated with the malware program.

References made herein to "marking" a byte sequence as being associated with a library function refer to a particular manner in which a byte sequence may be identified as having a likelihood of being representative of a library function. It will be recognized that in some instances, a byte sequence identified as having a likelihood of being representative of a library function may in actuality not be representative of a library function. This is acceptable in light of the desire to prevent any byte sequence that may potentially be associated with a library function from being used as a malware signature.

FIG. 1 illustrates an exemplary system 100 for identifying malware. As shown in FIG. 1, system 100 may include a client device 102 and a security computing subsystem 104 configured to communicate with one another. As will be described in more detail below, security computing subsystem 104 may be configured to automatically generate malware signatures. The malware signatures may be utilized by security computing subsystem 104 and/or client device 102 to identify or detect malware residing on client device 102.

Client device 102 generally represents any type or form of computing device capable of reading computer-executable instructions. Examples of client device 102 include, without limitation, laptops, desktops, servers, cellular phones, personal digital assistants (PDAs), multimedia players, embedded systems, combinations of one or more of the same, exemplary computing system 710 in FIG. 7, or any other suitable computing device.

Security computing subsystem 104 generally represents any combination of hardware, software, and/or firmware configured to provide one or more data security features to client device 102. Such data security features may include, but are not limited to, automatic malware signature generation, identification and removal of malware residing on client device 102, and/or any other data security feature as may serve a particular application.

Client device 102 and security computing subsystem 104 may each include one or modules configured to perform one or more of the tasks described herein. In certain embodiments, one or more of the modules described herein may represent one or more software applications or programs that, when executed by a computing device, may cause the computing device to perform one or more tasks. For example, as will be described in greater detail below, one or more of the modules described herein may represent software modules stored and configured to run on one or more computing devices or subsystems, such as client device 102, security computing subsystem 104, computing system 710 in FIG. 7, and/or portions of exemplary network architecture 800 in FIG. 8. One or more of the modules described herein may also represent all or portions of one or more special-purpose computers configured to perform one or more tasks.

Client device 102 and security computing subsystem 104 may communicate using any communication platforms and technologies suitable for transporting data, including known communication technologies, devices, media, and protocols supportive of remote or local data communications. For example, as will be described in connection with FIG. 2, client device 102 and security computing subsystem 104 may communicate using a network. Additionally or alternatively, a computer-readable storage medium (e.g., an optical disc, flash drive, etc.) may be used to transport data from security computing subsystem 104 to client device 102.

Figure 2:
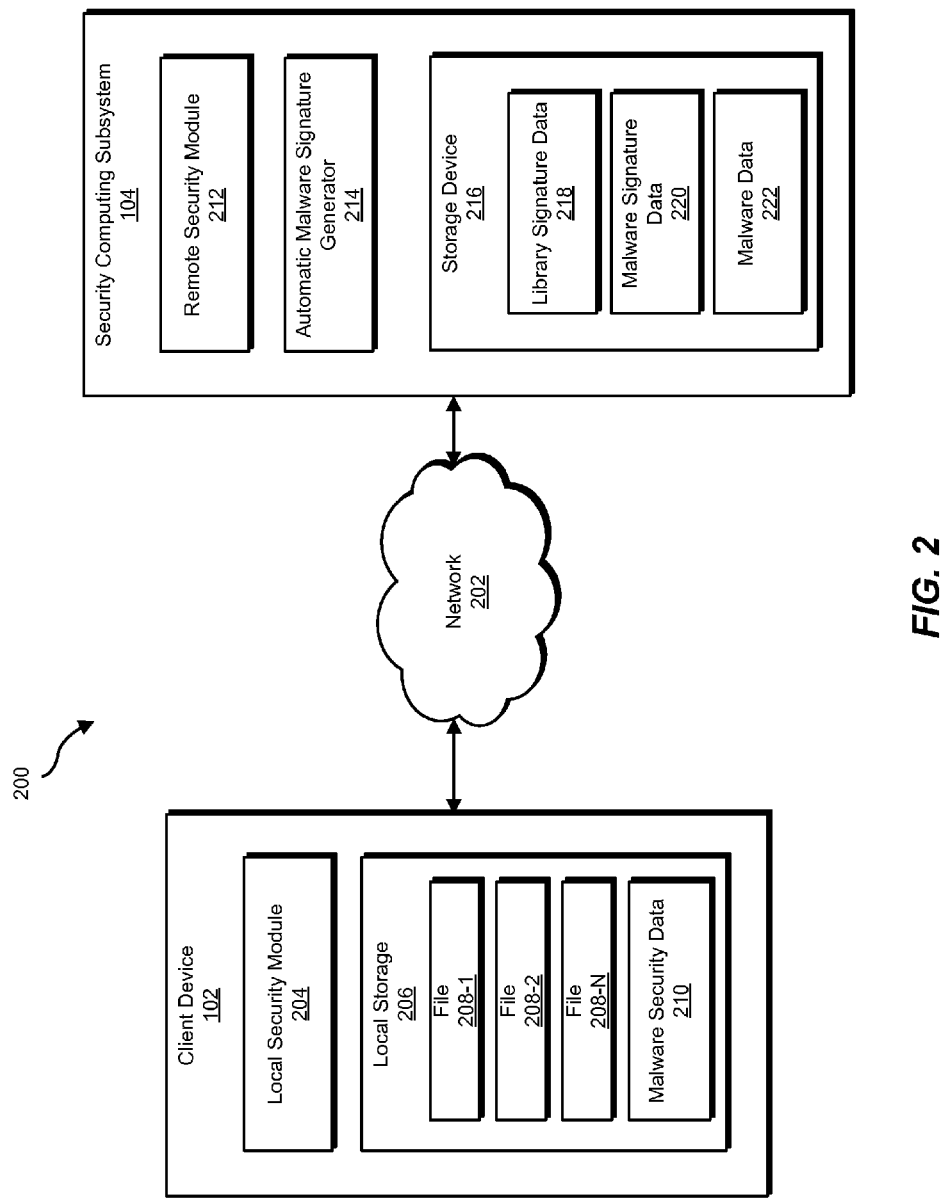
FIG. 2 is a block diagram of an exemplary implementation of the system of FIG. 1 according to one embodiment.

FIG. 2 shows an exemplary implementation 200 of system 100 wherein client device 102 and security computing subsystem 104 are communicatively coupled via a network 202. Network 202 generally represents any medium or architecture capable of facilitating communication or data transfer. Examples of network 202 include, without limitation, an intranet, a wide area network (WAN), a local area network (LAN), a personal area network (PAN), the Internet, power line communications (PLC), a cellular network (e.g., GSN network), exemplary network architecture 900 in FIG. 9, or the like. Network 202 may facilitate communication or data transfer using wireless or wired connections. In one embodiment, network 202 may facilitate communication between client device 102 and security computing subsystem 104.

As shown in FIG. 2, client device 102 may include a local security module 204 and a local storage 206. Local storage 206 generally represents any type or form of storage device, such as the storage devices illustrated and described in connection with FIGS. 7 and 8. Local storage 206 may be configured to store one or more files (e.g., files 208-1 through 208-N, collectively referred to herein as "files 208") and malware security data 210. Files 208 may include any type of file, such as, but not limited to, data files and executable files. In some instances, one or more of files 208 may undesirably comprise malware. Malware security data 210 may include any data used to identify and/or treat files comprising or otherwise associated with malware. For example, malware security data 210 may include one or more malware signatures generated by security computing subsystem 104 and/or any other data associated with malware security as may serve a particular application.

Local security module 204 may be configured to receive malware security data 210 from security computing subsystem 104. Local security module 204 may be further configured to identify malware residing on client device 102 by comparing one or more files (e.g., files 208) with one or more malware signatures provided by security computing subsystem 104. Local security module 204 may be further configured to remove, quarantine, and/or otherwise treat files comprising or otherwise associated with malware.

Security computing subsystem 104 may include, but is not limited to, a remote security module 212, an automatic malware signature generator 214, and a storage device 216.

Remote security module 212 may be configured to transmit malware security data 210 to local security module 204 of client device 102. For example, remote security module 212 may transmit one or more malware updates comprising malware signatures generated by automatic malware signature generator 214 to local security module 204. Remote security module 212 may transmit malware security data 210 on a periodic (e.g., daily or hourly) basis, in response to one or more newly generated malware signatures, and/or as requested by local security module 204.

Automatic malware signature generator 214 may include any combination of hardware, software, and/or firmware configured to automatically generate one or more malware signatures. The malware signatures may be used to identify malware residing on client device 102. Specific embodiments of automatic malware signature generator 214 will be described in more detail below.

Storage device 216 generally represents any type or form of storage device, such as the storage devices illustrated and described in connection with FIGS. 7 and 8. Storage device 216 may be configured to store library signature data 218 representative of one or more library signatures, malware signature data 220 representative of one or more malware signatures, malware data 222 representative of one or more malware programs, and/or any other type of data. Data 218, 220, and 222 may be arranged in one or more databases, look-up tables, and/or file structures as may serve a particular application. As will be described in more detail below, data 218, 220, and 222 may be generated, used, and/or modified by automatic malware signature generator 214 to generate one or more malware signatures.

As mentioned, it is desirable to ensure that the malware signatures generated by automatic malware signature generator 214 do not result in false positives when used to identify malware. A false positive may occur when goodware is incorrectly identified as comprising malware. In some instances, a false positive may result when the particular malware signature used to identify malware comprises a byte sequence representative of a library function. This is because library functions are often used by both malware and goodware. Hence, it is desirable to prevent byte sequences representative of library functions from being used as malware signatures in order to minimize the number of goodware programs that are incorrectly identified as malware using automatically generated malware signatures.

To this end, automatic malware signature generator 214 may be configured to identify byte sequences within a malware program that have a likelihood of being representative of library functions contained within the malware program. The identified byte sequences may then be prevented from being used as malware signatures. As will be described in more detail below, the identification of byte sequences within a malware program that have a likelihood of being representative of one or more library functions may be realized by marking one or more byte sequences as being associated with one or more library functions.

In some instances, it is possible that automatic signature generator 214 may incorrectly identify one or more byte sequences representative of one or more non-library functions as having a likelihood of being representative of one or more library functions. Such misidentification is acceptable in light of the desire to prevent any byte sequence that may potentially be associated with a library function from being used as a malware signature. In this manner, the number of goodware programs that are incorrectly identified as malware using automatically generated malware signatures may be minimized.

Figure 3:
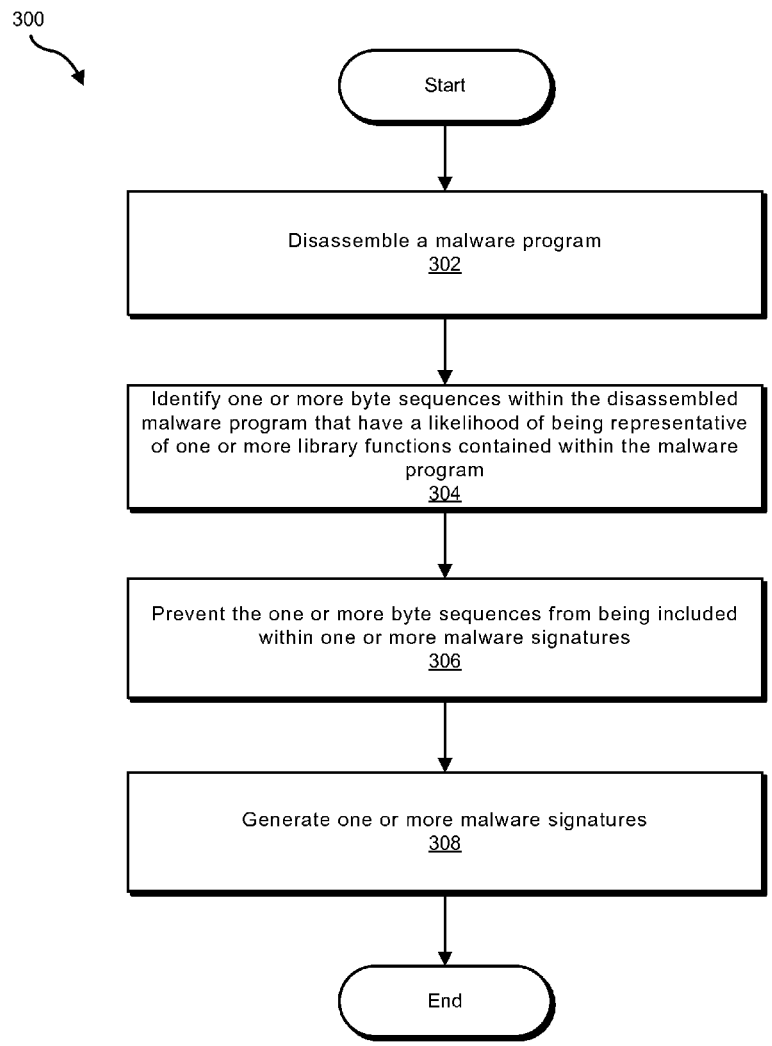
FIG. 3 is a flow diagram of an exemplary method for facilitating automatic malware signature generation.
Figure 4:
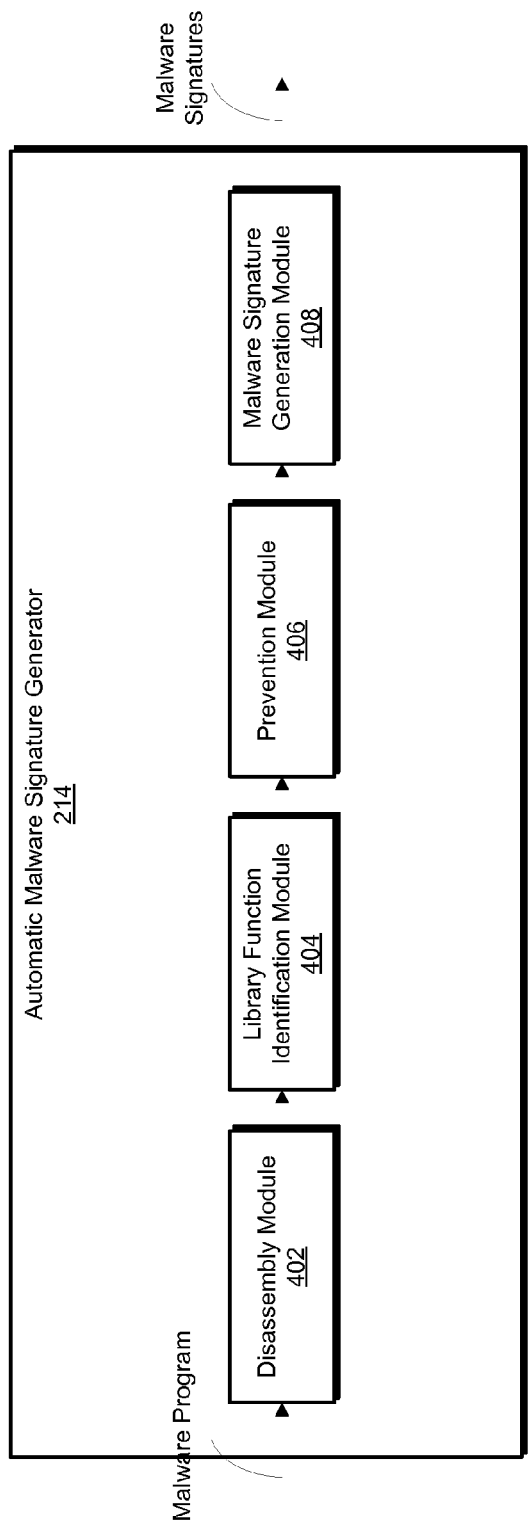
FIG. 4 is a block diagram of exemplary modules included within an automatic malware signature generator according to one embodiment.

FIG. 3 is a flow diagram of an exemplary method 300 for facilitating automatic malware signature generation. Each step shown in FIG. 3 may be performed by one or more components of security computing subsystem 104. For example, one or more steps shown in FIG. 3 may be performed by automatic malware signature generator 214. To this end, FIG. 4 shows that automatic malware signature generator 214 may include a disassembly module 402, a library function identification module 404, a prevention module 406, and a malware signature generation module 408. One or more of these modules may be configured to perform one or more of the steps shown in FIG. 3.

In step 302, a malware program is disassembled. For example, disassembly module 402 shown in FIG. 4 may be configured to receive malware data 222 representative of a malware program and transform the malware program into a disassembled malware program. In this manner, the individual bytes that comprise the malware program may be analyzed. For example, disassembly module 402 may be configured to parse a binary image of a malware program and transform it into assembly language or some equivalent representation. Any suitable disassembly algorithm or heuristic may be used by disassembly module 402 to disassemble the malware program as may serve a particular application.

In step 304, one or more byte sequences within the disassembled malware program that have a likelihood of being representative of one or more library functions contained within the malware program are identified. In some examples, the identifying may be performed by library function identification module 404 in accordance with one or more identification heuristics. Exemplary, but not exclusive, identification heuristics that may be used by library function identification module 404 to identify one or more byte sequences within a disassembled malware program that have a likelihood of being representative of one or more library functions will now be described.

In some embodiments, library function identification module 404 may identify a byte sequence within a disassembled malware program as having a likelihood of being representative of a library function by comparing the byte sequence with one or more library signatures associated with at least one compiler. The library signatures may be stored within storage device 216 as library signature data 218. Each library signature comprises a sequence of bytes representative of a known library function. Hence, if a byte sequence within a disassembled malware program matches one of the library signatures, library function identification module 404 may mark the byte sequence as being associated with a library function.

As mentioned, the one or more library signatures to which a byte sequence is compared may be associated with at least one compiler. Exemplary compilers include, but are not limited to, Borland Delphi, Microsoft Visual C, C++, Java, etc. In some examples, a byte sequence within a malware program is compared to library signatures associated with a plurality of different compilers, regardless of the particular compiler used to generate the malware program. This is because an author of a particular malware program can post-process the malware program to hide or obfuscate the information that reveals which compiler generated the particular malware program. Hence, as long as a byte sequence within a malware program matches a library signature corresponding to a library function associated with a particular compiler within the plurality of compilers, the byte sequence may be identified as having a likelihood of being representative of a library function, even if the particular compiler does not appear to have been used to generate the malware program.

An additional or alternative identification heuristic that may be used by library function identification module 404 includes marking a byte sequence within a disassembled malware program that represents a function called (statically or in some other manner) by a known library function as being associated with a library function. The known library function may be represented by library signature data 218, identified in the library signature comparison heuristic described above, and/or provided in any other manner as may serve a particular application.

A library typically includes one or more entry point functions, which are exposed to application developers, and internal functions, which are used internally within a library. An entry point function may call, either directly or indirectly, one or more other entry point functions and/or internal functions. In some examples, a function called by a known library function is also a library function. Hence, by determining which functions within a malware program are called by entry point functions and other known library functions, library function identification module 404 may mark the byte sequences corresponding to the called functions as being associated with library functions.

To facilitate identification of functions contained within a malware program that are called by known library functions, library function identification module 404 may be configured to build a function call graph representation of the malware program.

Figure 5:
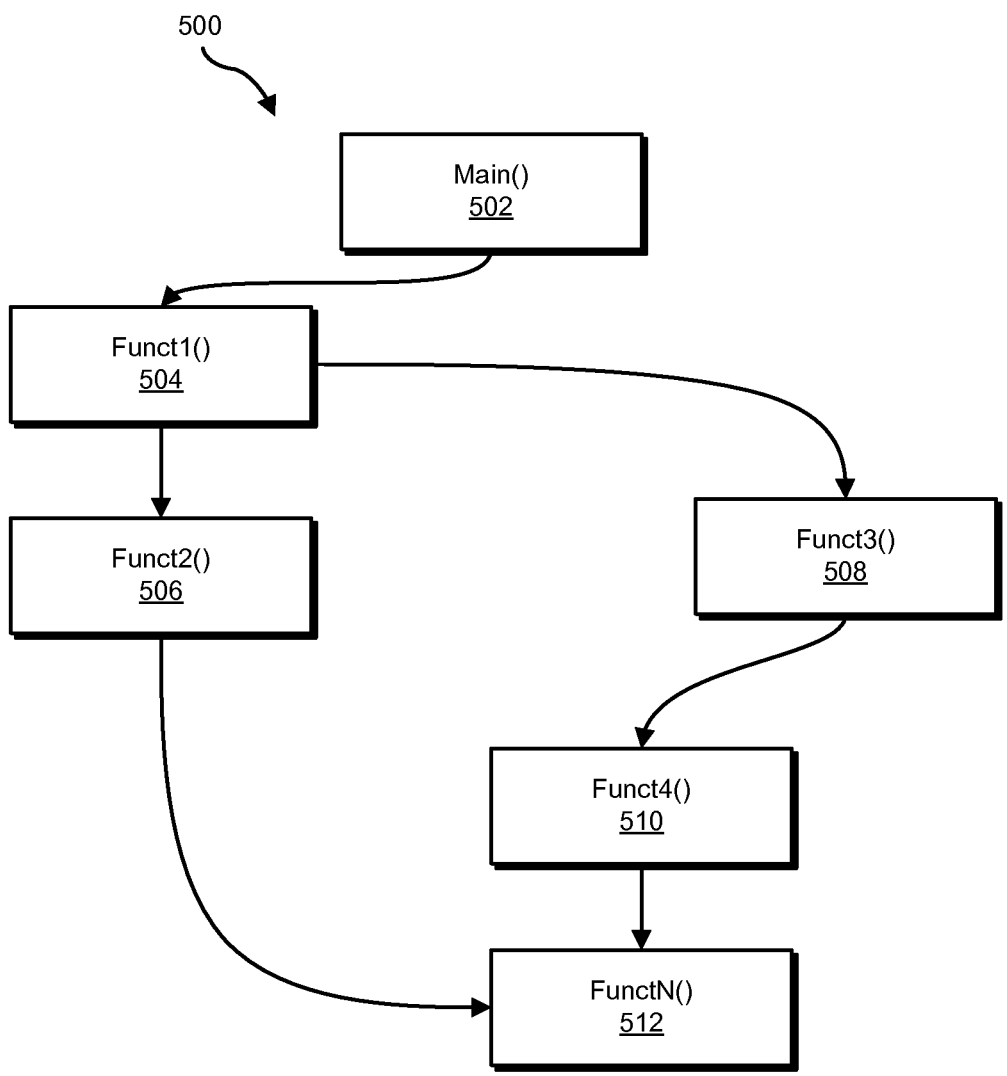
FIG. 5 illustrates an exemplary function call graph representation that may be built by a library function identification module according to one embodiment.

FIG. 5 illustrates an exemplary function call graph representation 500 that may be built by library function identification module 404. As shown in FIG. 5, function call graph representation 500 is configured to illustrate a call relationship between a plurality of functions contained within a malware program. For example, FIG. 5 shows that a main function 502, which may be an entry point function, calls a first function 504. The first function 504 calls a second function 506 and a third function 508. The third function 508 calls a fourth function 510. The fourth function calls an Nth function 512. It will be recognized that the call relationship illustrated in FIG. 5 is merely illustrative of the many different call relationships that may exist within a particular malware program.

By analyzing function call graph representation 500, library function identification module 404 may determine whether a function represented by a particular byte sequence within the malware program is called, either directly or indirectly, by a known library function. For example, function identification module 404 may determine, based on function call graph representation 500, that byte sequences associated with functions 502-512 are associated with library functions and mark the byte sequences accordingly.

Once a byte sequence has been identified as being associated with a function called by a known library function, the function associated with the byte sequence is analyzed to determine if it calls any other functions. Byte sequences corresponding to those functions may in turn be marked as library functions. The process may be repeated until the set of marked library functions converges.

In some examples, a library function (e.g., an entry point function) calls another function through a function pointer. In some instances, these types of function calls do not appear in a function call graph representation. Hence, library function identification module 404 may be configured to heuristically detect function pointer tables used in known library functions, use these tables to identify functions called in this manner, and mark byte sequences corresponding to the identified functions as library functions. The function pointer tables may be detected using any suitable algorithm or heuristic as may serve a particular application.

In some examples, a compiler of a malware program automatically includes one or more startup functions within the malware program that call non-library functions included within the malware program. While these automatically included functions are sometimes referred to as library functions, library function identification module 404 may be configured to mark them as non-library functions. In this manner, other non-library functions called by such functions will not be marked as being library functions.

To illustrate, a "start" function may be automatically included by a compiler in a portable executable (PE) binary. This function may be configured to call non-library functions within the PE binary. Hence, library function identification module 404 may be configured to mark the "start" function as a non-library function. Library function identification module 404 may be configured to detect automatically included functions that call non-library functions and exclude the automatically included functions from being considered as library functions using any suitable heuristic as may serve a particular application.

For example, suppose that the main function 502 in FIG. 5 is an automatically included startup function. It may therefore be considered to be a non-library function. Hence, if function 508 is a known library function, it can be deduced that functions 510 and 512 are also library functions because they are called by function 508. However, functions 504 and 506 can remain classified as non-library functions since they merely call (and are not called by) known library functions.

An additional or alternative identification heuristic that may be used by library function identification module 404 includes marking one or more byte sequences within a malware program that are located within a predetermined distance from an address space corresponding to at least one known library function as being associated with a library function. When a library is statically linked into a binary malware program, the library occupies a contiguous address space range. Therefore, a byte sequence occupying an address space immediately surrounded by address spaces occupied by byte sequences associated with known library functions has a high likelihood of also being associated with a library function.

This physical proximity property of functions that belong to the same library may be exploited by library function identification module 404 to identify byte sequences having a likelihood of being associated with library functions. For example, library function identification module 404 may be configured to recognize that a particular byte sequence occupies an address space surrounded by address spaces immediately surrounded by address spaces occupied by byte sequences associated with known library functions and mark the byte sequence as being associated with a library function.

Figure 6:
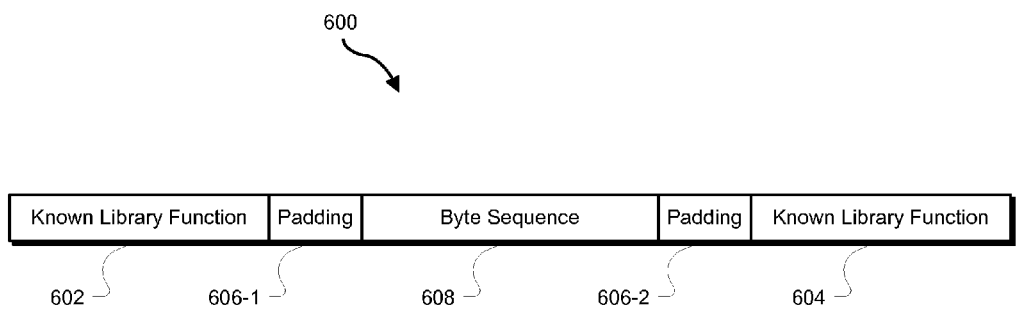
FIG. 6 shows a representation of an exemplary address space range according to one embodiment.

In some instances, padding space may be located in between address spaces corresponding to adjacent functions in a library. To illustrate, FIG. 6 shows a representation of an exemplary address space range 600. As shown in FIG. 6, byte sequences associated with known library functions may occupy address spaces 602 and 604. Each address space 602 and 604 is separated from adjacent address spaces associated with other functions by padding space (e.g., padding space 606-1 and 606-2, collectively referred to herein as "padding space 606"). Each padding space 606 may be of any suitable size depending on the particular malware program.

To account for possible presence of padding space 606, library function identification module 404 may be configured to detect whether a byte sequence occupies an address space that is within a predetermined threshold distance from an address space occupied by a known library function. If it is, library function identification module 404 may be configured to mark the byte sequence as being associated with a library function.

For example, FIG. 6 shows that a particular byte sequence may occupy an address space 608, which is immediately surrounded by padding space 606. Library function identification module 404 may be configured to determine whether address space 608 is within a predetermined threshold distance from address space 602 and/or address space 604. If address space 608 is within the predetermined threshold distance from either one of address spaces 602 and 604, the byte sequence occupying address space 608 may be marked as being associated with a library function.

The predetermined threshold distance may be determined in any suitable manner. For example, the predetermined threshold distance may be based on a statistical analysis of the inter-library address space and intra-library address space of a plurality of binary malware and/or goodware programs generated by one or more compilers. The statistical analysis may be configured to determine an average size of padding spaces 606, a maximum size of padding spaces 606, and/or any other metric associated with the padding spaces 606 as may serve a particular application.

An additional or alternative identification heuristic that may be used by library function identification module 404 includes determining whether a byte sequence included within a malware program represents a function that accesses at least one global variable associated with the malware program. It will be recognized that libraries rarely export global variables for use outside of library functions. Hence, a byte sequence associated with a function that accesses one or more global variables may be marked by library function identification module 404 as being associated with a library function. To this end, library identification module 404 or any other suitable module may be configured to generate a list of global variables accessed by known library functions. The list of global variables may be generated in any suitable manner as may serve a particular application.

In some examples, one or more of the identification heuristics described herein may be used in an iterative manner by library function identification module 404 to mark byte sequences within a malware program as being associated with a library function until the set of marked byte sequences converges. For example, a first set of byte sequences may be marked as being associated with library functions by comparing the byte sequences to library signatures. Functions called by functions associated with the marked byte sequences may then be identified in order to mark more byte sequences as being associated with library functions. Address space proximity of byte sequences to address spaces associated with each of the identified library functions may then be used to mark yet more byte sequences as being associated with library functions. Global variable analysis may then be performed to identify more library functions. One or more of these steps may be repeated until the set of marked byte sequences converges. For purposes of the identification heuristics described herein, a byte sequence identified as having a likelihood of being representative of a library function may be treated as being representative of a known library function. It will be recognized that identification heuristics may be applied to a particular malware program in any order.

Returning to FIG. 3, the byte sequences identified as having a likelihood of being representative of one or more library functions are prevented from being included within one or more malware signatures (step 306). For example, prevention module 406 included within automatic malware signature generator 214 may be configured to receive data indicative of which byte sequences have been identified as having a likelihood of being representative of a library function. Prevention module 406 may then prevent these byte sequences from being included within malware signatures generated by automatic malware signature generator 214. Prevention module 406 may be configured to prevent byte sequences from being included within malware signatures generated by automatic malware signature generator 214 in any suitable manner as may serve a particular application.

In step 308, one or more malware signatures are generated. For example, malware signature generation module 408 included within automatic malware signature generator 214 may be configured to generate one or more malware signatures using one or more byte sequences associated with non-library functions. Malware signature data 220 and storage device 216 may be transformed in response to the generation of the malware signatures.

It will be recognized that one or more of the steps shown in FIG. 3 may be repeated for a plurality of malware programs in order to identify byte sequences contained within one or more of the malware programs that are associated with non-library functions. In this manner, the set of marked byte sequences associated with library functions may be increased, thereby decreasing the likelihood of generating malware signatures that result in false positives.

As detailed above, the automatic generation of malware signatures used to identify malware may be based on non-library functions included within malware as opposed to library functions that may be included within both malware and goodware. By proceeding in this manner, the exemplary systems and methods described herein may reduce the number of byte sequences associated with library functions used to generate malware signatures, and thereby minimize the number of goodware programs incorrectly identified as comprising malware.

Figure 7:
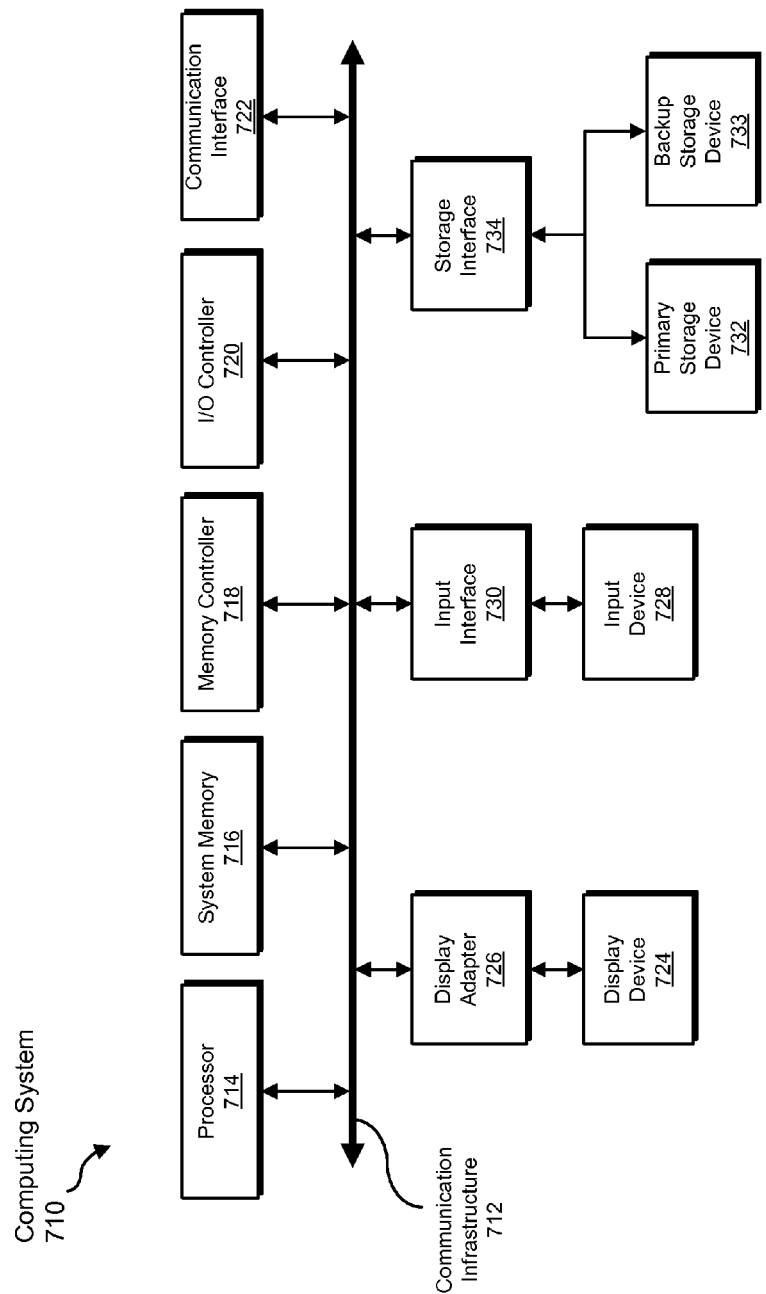
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may comprise at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the disassembling, identifying, preventing, and generating steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may comprise both a volatile memory unit (such as, for example, system memory 716) and a non-volatile storage device (such as, for example, primary storage device 732, as described in detail below).

In certain embodiments, exemplary computing system 710 may also comprise one or more components or elements in addition to processor 714 and system memory 716. For example, as illustrated in FIG. 7, computing system 710 may comprise a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller may perform and/or be a means for performing, either alone or in combination with other elements, one or more of the steps or features described and/or illustrated herein, such as disassembling, identifying, preventing, and generating.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the disassembling, identifying, preventing, and generating steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network comprising additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 794 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the disassembling, identifying, preventing, and generating steps disclosed herein. Communication interface 722 may also be used to perform and/or be a means for performing other steps and features set forth in the instant disclosure.

As illustrated in FIG. 7, computing system 710 may also comprise at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also comprise at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the disassembling, identifying, preventing, and generating steps disclosed herein. Input device 728 may also be used to perform and/or be a means for performing other steps and features set forth in the instant disclosure.

As illustrated in FIG. 7, exemplary computing system 710 may also comprise a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also comprise other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, storage devices 732 and 733 may be used, for example, to perform and/or be a means for performing, either alone or in combination with other elements, one or more of the disassembling, identifying, preventing, and generating steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable storage medium. The phrase "computer-readable storage medium" generally refers to any form of device, carrier, or medium capable of storing or carrying computer-readable instructions. Examples of computer-readable storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable storage medium containing the computer program may be loaded into computing system 710. All or a portion of the computer program stored on the computer-readable storage medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
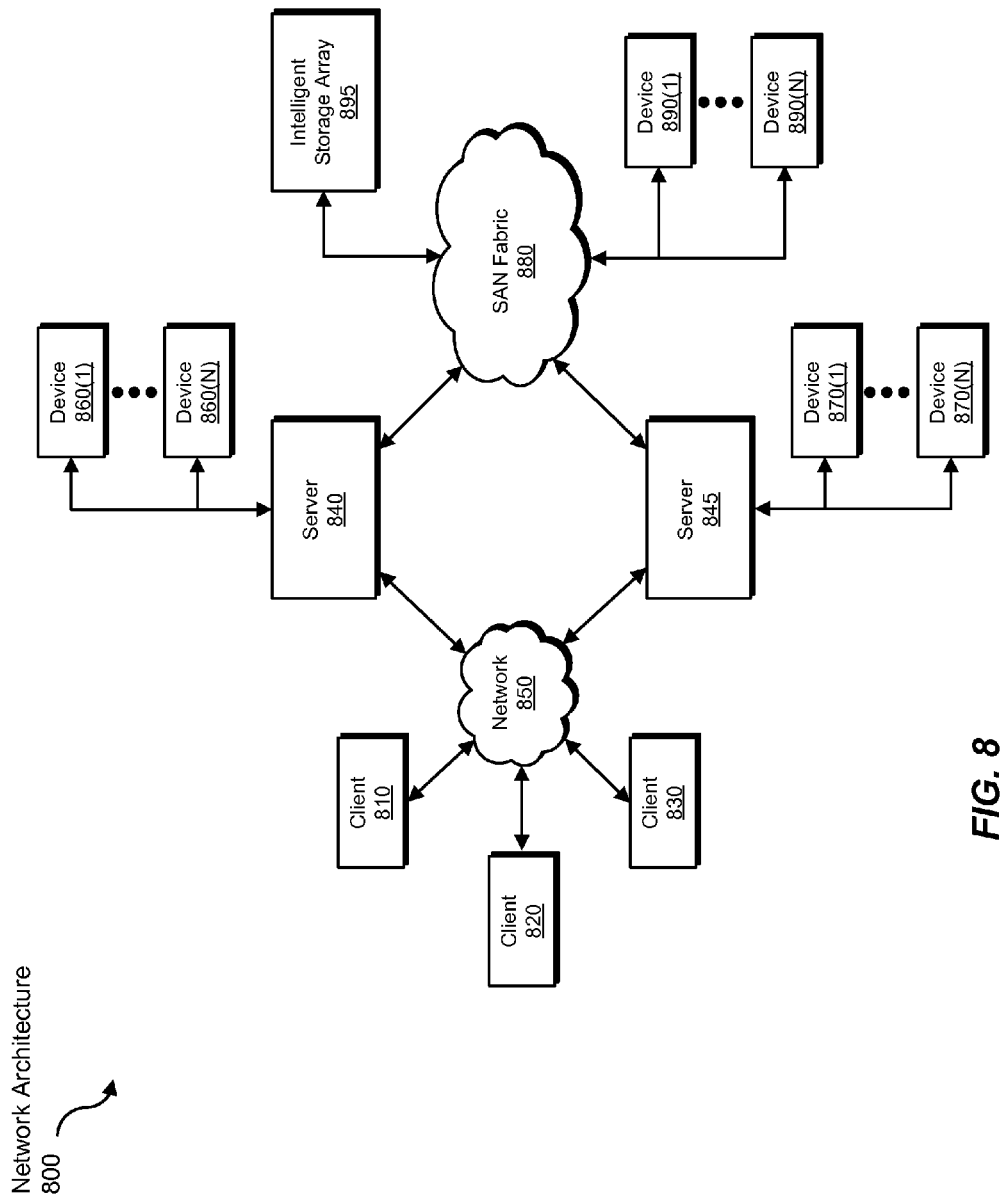
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for disassembling, identifying, preventing, and generating steps disclosed herein. Network architecture 800 may also be used to perform and/or be a means for performing other steps and features set forth in the instant disclosure.

As detailed above, computing system 710 and/or one or more components of network architecture 800 may perform and/or be a means for performing, either alone or in combination with other elements, one or more steps of an exemplary method for facilitating automatic malware signature generation. In one example, a method for performing such a task may comprise: 1) disassembling a malware program, 2) identifying one or more byte sequences within the disassembled malware program that have a likelihood of being representative of one or more library functions contained within the malware program, and 3) preventing the one or more byte sequences from being included within one or more malware signatures.

In some embodiments, the identified one or more byte sequences match one or more library signatures associated with at least one compiler.

The identified one or more byte sequences may additionally or alternatively represent one or more functions called by at least one known library function. To identify the one or more functions called by at least one known library function, the method may further include building a function call graph representation of the malware program and using the function call graph representation to determine that the one or more byte sequences represent the one or more functions called by the at least one known library function. Additionally or alternatively, the method may include detecting one or more function pointer tables used in the at least one known library function and using the one or more function pointer tables to determine that the one or more byte sequences represent the one or more functions called by the at least one known library function. Additionally or alternatively, the method may include excluding from the at least one known library function one or more functions automatically included within the malware program by a compiler of the malware program.

In some embodiments, the identified one or more byte sequences represent one or more functions directly or indirectly called by the at least one known library function.

In some embodiments, the identified one or more byte sequences are located within a predetermined threshold distance from an address space corresponding to at least one of the known library functions. For example, the identified one or more byte sequences may be located at an address immediately surrounded by address spaces corresponding to two of the known library functions. In some embodiments, the method further comprises basing the predetermined threshold distance on a statistical analysis of inter-library space and intra-library space in programs generated by one or more compilers.

In some embodiments, the identified one or more byte sequences represent one or more functions that access at least one global variable. A variable may be determined to be one of the at least one global variable if the variable is accessed by at least one known library function.

In some embodiments, a system for facilitating automatic malware signature generation includes a disassembly module configured to disassemble a malware program, a library function identification module communicatively coupled to the disassembly module and configured to identify one or more byte sequences within the disassembled malware program that have a likelihood of being associated with one or more library functions contained within the malware program, and a prevention module communicatively coupled to the library function identification module and configured to prevent the one or more byte sequences from being included within one or more malware signatures.

In some embodiments, a computer-readable storage medium includes instructions configured to direct a computer system to disassemble a malware program, identify one or more byte sequences within the disassembled malware program that have a likelihood of being representative of one or more library functions contained within the malware program, and prevent the one or more byte sequences from being included within one or more malware signatures.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for facilitating automatic malware signature generation, at least a portion of the method being performed by a computing system comprising at least one processor, the method comprising:
    disassembling a malware program;
    identifying a byte sequence contained within the disassembled malware program as having a likelihood of being associated with a known library function contained within the malware program by determining that the known library function calls a function represented by the byte sequence;
    when generating one or more malware signatures for the malware program in order to identify the malware program, preventing the byte sequence from being included within the one or more malware signatures for the malware program based on the determination that the known library function calls the function represented by the byte sequence.

2. The method of claim 1, wherein identifying the byte sequence comprises determining that the byte sequence matches one or more library signatures associated with at least one compiler.

3. The method of claim 1, wherein disassembling the malware program comprises parsing a binary image of the malware program and transforming the binary image into an assembly language.

4. The method of claim 1, wherein identifying the byte sequence comprises:
    building a function call graph representation of the malware program;
    determining, by using the function call graph representation, that the byte sequence represents the function called by the known library function.

5. The method of claim 1, wherein identifying the byte sequence comprises:
   detecting one or more function pointer tables used in the known library function;
   using the one or more function pointer tables to determine that the byte sequence represents the function called by the known library function.

6. The method of claim 1, further comprising excluding from being included within the one or more malware signatures one or more functions automatically included within the malware program by a compiler of the malware program.

7. The method of claim 1, further comprising excluding at least one function called by the function represented by the byte sequence from being included within the one or more malware signatures.

8. The method of claim 1, wherein identifying the byte sequence comprises determining that the byte sequence is located within a predetermined threshold distance from an address space corresponding to at least one same or different known library function.

9. The method of claim 1, wherein identifying the byte sequence comprises determining that the byte sequence is located at an address immediately surrounded by address spaces corresponding to two known library functions.

10. The method of claim 8, further comprising basing the predetermined threshold distance on a statistical analysis of inter-library space and intra-library space in programs generated by one or more compilers.

11. The method of claim 1, wherein identifying the byte sequence comprises determining that the byte sequence represents one or more functions that access at least one global variable.

12. The method of claim 11, further comprising identifying the global variable by determining that the global variable is accessed by the same or different known library function.

13. A system for facilitating automatic malware signature generation, the system comprising:
   a disassembly module programmed to disassemble a malware program; a library function identification module programmed to identify sequence contained within the disassembled malware program as having a likelihood of being associated with a known library function contained within the malware program by determining that the known library function calls a function represented by the byte sequence;
   a prevention module programmed to, when generating one or more malware signatures for the malware program in order to identify the malware program, prevent the byte sequence a from being included within the one or more malware signatures for the malware program based on the determination that the known library function calls the function represented by the byte sequence;
   at least one hardware processor, coupled to a memory for storing computer executable instructions, configured to execute the disassembly module, the library function identification module, and the prevention module.

14. The system of claim 13, wherein the library function identification module identifies the byte sequence by determining that the byte sequence matches one or more library signatures associated with at least one compiler.

15. The system of claim 13, wherein the disassembly module disassembles the malware program by parsing a binary image of the malware program and transforming the binary image into an assembly language.

16. The system of claim 13, wherein the library function identification module identifies the byte sequence by determining that the byte sequence is located within a predetermined threshold distance from an address space corresponding to at least one same or different known library function.

17. The system of claim 13, wherein the library function identification module identifies the byte sequence by determining that the byte sequence represents one or more functions that access at least one global variable.

18. A non-transitory computer-readable storage medium including instructions configured to direct a computer system to:
   disassemble a malware program;
   identify a byte sequence contained within the disassembled malware program as having a likelihood of being associated with a known library function contained within the malware program by determining that the known library function calls a function represented by the byte sequence;
   when generating one or more malware signatures for the malware program in order to identify the malware program, prevent the byte sequence from being included within the one or more malware signatures for the malware program based on the determination that the known library function calls the function represented by the byte sequence.

19. The non-transitory computer-readable storage medium of claim 18, wherein the instructions are further configured to direct the computer system to disassemble the malware program by parsing a binary image of the malware program and transform the binary image into an assembly language.

20. The non-transitory computer-readable storage medium of claim 18, wherein the instructions are further configured to direct the computer system to identify the byte sequence by determining that the byte sequence is located within a predetermined threshold distance from an address space corresponding to at least one same or different known library function.

* * * * *

UNITED STATES PATENT AND TRADEMARK OFFICE
CERTIFICATE OF CORRECTION

PATENT NO. : 8,881,287 B1  
APPLICATION NO. : 12/408277  
DATED : November 4, 2014  
INVENTOR(S) : Kent Griffin et al.

It is certified that error appears in the above-identified patent and that said Letters Patent is hereby corrected as shown below:

In The Claims

Claim 13, at column 17, lines 38 to 45, should read:

a disassembly module programmed to disassemble a malware program;

a library function identification module programmed to identify a byte sequence contained within the disassembled malware program as having a likelihood of being associated with a known library function contained within the malware program by determining that the known library function calls a function represented by the byte sequence;

Signed and Sealed this  
Eighth Day of September, 2015

Michelle K. Lee  
*Director of the United States Patent and Trademark Office*